United States Patent [19]

Klinger et al.

[11] Patent Number: 5,342,095
[45] Date of Patent: Aug. 30, 1994

[54] HIGH PRESSURE QUICK CONNECTOR

[75] Inventors: Gary Klinger, Allen Park; Duane Pontbriand, Metamora, both of Mich.

[73] Assignee: ITT Corporation, New York, N.Y.

[21] Appl. No.: 954,719

[22] Filed: Sep. 29, 1992

[51] Int. Cl.⁵ .................. F16L 37/22; F16L 35/00
[52] U.S. Cl. .................. 285/18; 285/318; 285/321; 285/351; 285/308
[58] Field of Search .................. 285/18, 318, 321, 351, 285/308, 921, 334

[56] References Cited

U.S. PATENT DOCUMENTS

| | | | |
|---|---|---|---|
| 2,939,728 | 6/1960 | Bitel | 285/318 X |
| 3,250,331 | 5/1966 | Boyle | 285/18 X |
| 4,376,525 | 3/1983 | Frémy | 285/321 X |
| 4,548,427 | 10/1985 | Press et al. | 285/321 X |
| 4,782,710 | 10/1988 | Konecny et al. | 285/318 X |
| 4,783,100 | 11/1988 | Klein | 285/321 |
| 4,906,031 | 3/1990 | Vyse | 285/318 |
| 5,080,405 | 1/1992 | Sasa | 285/318 X |
| 5,082,390 | 1/1992 | Balsells | 285/318 X |

FOREIGN PATENT DOCUMENTS

| | | | |
|---|---|---|---|
| 186079 | 7/1956 | Austria | 285/308 |
| 6830111 | 3/1964 | Canada | 285/318 |

Primary Examiner—Randolph A. Reese
Assistant Examiner—Heather Chun
Attorney, Agent, or Firm—Robert P. Seitter; J. Gordon Lewis

[57] ABSTRACT

A high pressure quick connector having a tube which includes an upset adjacent one end. A male locking assembly is positioned about the tube and includes a cavity enclosing the upset and a contoured outer surface defining first and second grooves spaced axially along the male locking assembly. A female member having an internal bore is adapted to receive the male locking member. The female member has an internal bore that includes a locking groove. An expandable annular locking ring is mounted about the contoured outer surface and the locking ring is initially mounted in the first groove and is slidable from the first groove to the second groove upon axial movement of the male locking assembly into the female member. The second groove is adjacent the locking groove upon full insertion of the male locking member into the female locking member with the expandable annular locking ring being positioned within the second groove and adjacent the locking groove so that the locking ring is nested between the adjacent second groove and the locking groove.

15 Claims, 2 Drawing Sheets

HIGH PRESSURE QUICK CONNECTOR

FIELD OF THE INVENTION

The present invention relates to high pressure quick connectors for connecting tubing sections and more particularly for connecting vehicle brake lines.

BACKGROUND OF THE INVENTION

Low cost quick connectors for connecting tubing have been widely used in automotive and non-automotive applications. Typically, they are used to connect small diameter fluid lines with low pull-off requirements.

One example of such a quick connector is known as an interference type connector. This type of connector has expandable fingers mounted in a housing that create a mechanical interference on an upset portion or bead formed on the tube to be connected. The tube and upset are inserted into the connector housing past the expandable fingers. The fingers expand to allow the upset to pass and then retract behind the bead to retain the tube within the housing. The retention or pull-off force required to separate the tube from the housing is largely dependent upon the rigidity of the expandable fingers. Greater pull off force is required when there is greater resistance to finger expansion. On the other hand, the greater the rigidity of the expandable fingers, the more difficult it is to lock the tube within the housing. Further, fingers that are more rigid are more difficult to manually expand to remove the tube when removal is desired.

There are many applications which require very high pull-off forces, but low insertion forces. One such application is the connection of brake lines of a vehicle. No catastrophic failure such as bursting is permitted below forces of 500. Correspondingly, low insertion forces on the order of 15 pounds are required. Because of the need for high pull-off forces and low insertion forces, typical quick connectors are unacceptable for connecting brake lines. They are also unacceptable in other applications requiring high pull-off forces and low insertion forces.

For many high pressure applications, particularly with brake lines, threaded fittings are used. Cross threading can be a problem and the torque must be gaged. Otherwise, leaking may result which has to be repaired. Further, since the threads are mated, they must be twisted together. This increases assembly time and labor while simultaneously resulting in worker fatigue. To use threaded fittings there must be sufficient space for tools such as wrenches. It is difficult to use such tools in a blind location.

It is also difficult to separate threaded fittings. Many of the problems discussed with respect to their connection are present. Further, contaminant buildup between the fittings can make separation almost impossible. Thus, servicing is very difficult.

SUMMARY OF THE INVENTION

The present invention overcomes problems with typical quick connectors by providing a high pressure quick connector which has high pull-off forces, in excess of 500 pounds. Yet, the present invention has low insertion forces, on the order of 15 pounds. Further, the present invention overcomes many of the problems associated with threaded high pressure fittings.

In the preferred embodiment of the present invention, a high pressure line or tube is provided which is pre-assembled with a male locking member and seals attached. The tube can be inserted into a female member, and with slight pushing force, locked into the female member with a fluid tight seal.

The tube has an upset that is enclosed within the male member. The male member has a longitudinally extending bore for receipt of the tube. The exterior of the male member is contoured for sliding containment of a garter spring which is adapted to slide between insertion and locked positions along the male member in response to axial contact with the interior of the female member. In the preferred embodiment, the garter spring is a coil spring that is connected at its free ends to form a continuous loop.

The specific contoured sections of the male member define a pair of spaced recesses or grooves that are adapted to retain the spring. The first groove is adapted to receive the garter spring and initially retain it. The second groove or locking groove is adapted to retain the spring when the male member has been fully inserted into the female member or housing. These two grooves are separated by a flange that acts on the spring to initially expand it for receipt by the locking groove and to act upon the spring to prevent the male member from being removed once it is in the locked position. Additionally, the contoured surface has inclined surfaces that guide the spring between the first and the second grooves.

When the male member has been inserted, the locking groove is position adjacent a retaining groove formed in the interior wall of the housing. The locking groove and the retaining groove sandwich the spring to prevent the male member from being removed. The spring is acted upon in shear by the flange, which partly defines the locking groove, and by the retaining groove. Due to the action of the forces upon the spring, tremendous force is necessary to pull the flange past the spring. Forces of over 500 pounds are required to compress the spring in shear and extract the male member.

The first and second grooves in the male member have different diameters with the first diameter being smaller than the second or locking groove diameter. In this way, the spring can be easily inserted into the female member without interference and then ramped along the exterior of the male member until the spring is seated into the locking groove. The force required to insert the male member is only the force necessary to expand the spring. Therefore, only very low insertion forces are needed.

DESCRIPTION OF THE INVENTION

The high pressure quick connect of the present invention is shown generally at 10 in FIGS. 1 through 4. The quick connect 10 is used to rapidly and effectively connect a high pressure line or tube 12, such as a brake line, to another vehicle part, such as for example the brake assembly of a vehicle. In the disclosed embodiment, the tube 12 is connected to a housing 14 which in the preferred embodiment is made of metal and has a threaded free end 16 that can be threaded into the receiving part of the vehicle which would have mating internal threads.

Figure 5:
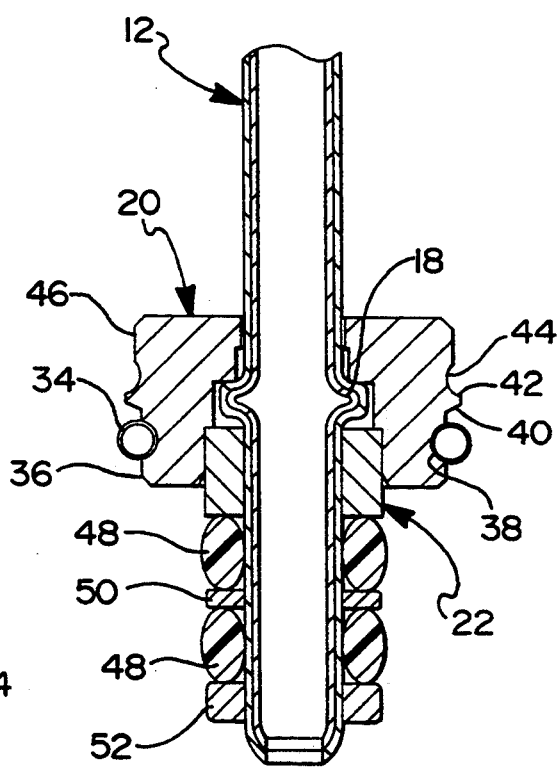
FIG. 5 is a cross-sectional view the tube pre-assembled.

In the preferred embodiment, the tube 12 is pre-assembled as illustrated in FIG. 5 so that it can be inserted into housing 14 to make a fluid tight connection. Tube 12 has an upset 18 that is enclosed within a retainer cap 20 and a top hat 22, both of which are made of metal in the preferred embodiment. The retainer cap 20 and top hat (or retaining ring) 22 have longitudinally extending bores 24 and 25 for receipt of tube 12. Bore 24 of cap 20 is defined by several bores that have varying diameters along the length of bore 24 to provide a series of steps. The narrowest bore 26 is at the top of the cap 20 and is generally the same diameter as bore 25 in top hat 22 with both being slightly larger than the diameter of tube 12. The diameters of bores 25 and 26 are dimensioned to closely contain tube 12 to prevent lateral movement of tube 12 when connected within housing 14. It should be appreciated that lateral forces applied to tube 12, unless restrained, could cause fluid leaks from housing 14.

The widest bore 28 is at the bottom of cap 20 and is adapted to receive top hat 22. In the preferred embodiment, bore 28 has a diameter that is slightly less than the outside diameter of top hat 22 so that top hat 22 can be press fit into bore 28. As can be seen, top hat 22 engages the step formed between bore 28 and the adjoining bore 32. It should be appreciated by those of ordinary skill in the art that the top hat 22 could be connected to cap 20 by other means other than press fitting, for example, top hat 22 could be threaded into bore 28.

Bore 32 ends in a reduced diameter bore 30 which forms another step. This step and top hat 22 define the cavity into which upset 18 is contained and defines the axial travel limits of upset 18 with respect to cap 20 and top hat 22.

Bore 32 ends in a reduced diameter bore 32. Bore 32 is slightly wider than the narrowest bore 26 to ensure that the step formed between the bore 30 and bore 32 engages the upset 18 in line contact. If bore 32 had the same diameter as bore 26, the step could engage the upset 18 in point contact and be a potential wear point. This is primarily due to the rounded corner that is formed when upset 18 is formed requiring the end of the step to be spaced slightly away from the tube 12 to avoid point contact.

The exterior of cap 20 is contoured for sliding containment of a garter spring 34 which is adapted to slide between insertion and locked positions along cap 20 in response to axial contact with the interior of housing 14. In the preferred embodiment, garter spring 34 is a stainless steel coil spring that is connected at its free ends to form a continuous loop. The various positions of garter spring 34 as tube 12 is inserted into housing 14 are illustrated in FIGS. 1 through 4 and will be discussed in detail below.

With reference to FIG. 5, the specific contoured sections of cap 20 are disclosed. The contours of cap 20 define an insertion portion 36 which is adapted to be inserted into the housing 14. Adjacent insertion portion 36, there is a concave radiused portion or first groove 38. This first groove 38 is adapted to receive the garter spring 34 and initially retain it, see in FIG. 1. Groove 38 ends in an inclined section 40 which in turn ends in a flanged portion 42. Inclined section 40 acts as a ramping surface to ramp garter spring 34 from groove 38 to the flanged portion 42 which in turn ramps garter spring 34 into the locking radius or groove 44. The ramping action of spring 34, as will be defined more fully below is a result of axial movement of tube 12 into housing 14. Locking groove 44 terminates into a terminal portion 46. As disclosed, locking groove 44 doesn't form a complete semi-circle, but has a smaller side wall adjacent portion 46.

The tube assembly 12 is completed by mounting O-rings 48 on the end of the tube 12. The O-rings function as seals to prevent fluid from leaking from housing 14. In the preferred embodiment, there are two O-rings that are separated by a spacer 50. The O-rings 48 and the spacer 50 are retained on the tube 12 by a compression ring 52.

Housing 14 is configured to receive the assembled line 12 and once fully received, to lock tube 12, via the garter spring 34, within housing 14. Housing 14 has a flared end 60 with a generally cylindrical recessed portion 62 adjacent to flared end 60 which defines a first section or first bore. This first recessed portion 62 ends in a annular groove 64 which is defined by an inclined wall 66, a back wall 68 and a slightly inclined bottom wall or shoulder 70. Groove 64 is the retention groove which mates or nests with the locking groove 44 to lock the garter spring 34 therebetween and as a result to lock tube 12 into housing 14.

Shoulder 70 of groove 64 terminates at a bore 72 which extends from shoulder 70 to a shoulder 74. Shoulder 74 ends in a slightly inclined portion 76 which in turn ends in a narrower bore 78. As illustrated, bore 78 has a diameter that is configured to tightly receive O-rings 48 to form a fluid seal between tube 12 and housing 14. Bore 78 ends in a shoulder 80 which has a still narrower bore 82 extending through the end 84 of housing 14. Threads 86 are provided about the outer periphery of the lower portion housing 14 for the attachment of housing 14 to a mating member which is not shown. It should be understood by one of ordinary skill in the art that housing 14 would not be necessary if the various bores and shoulders were directly formed in the body to which tube 12 is to be attached.

Figure 1:
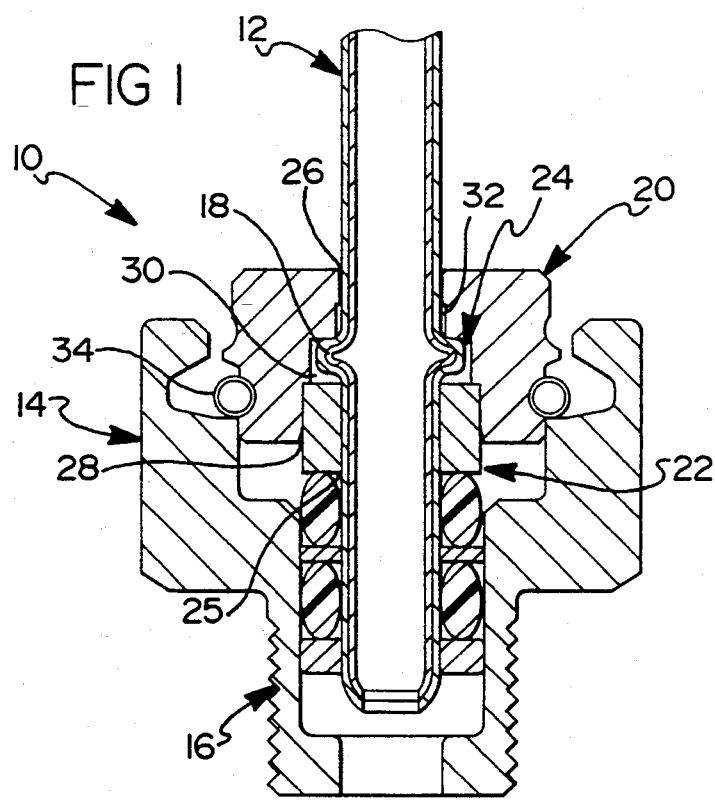
FIG. 1 is a cross-sectional view of the high pressure quick connect of the present invention with the tube being initially inserted.

With reference to FIGS. 1 through 4, the connection of tube assembly 12 to housing 14 will be described. FIG. 1 illustrates the initial insertion of tube 12 into housing 14. As should be appreciated, in the preferred embodiment tube assembly 12 is pre-assembled as shown in FIG. 5. Upon insertion, flared end 60 of housing 14 acts as a guiding surface to guide insertion portion 36 into recessed portion 62. Recessed portion 62 and flared end 60 have a diameter that is wide enough to easily allow cap 20 to pass.

As tube 12 is inserted, insertion portion 36 passes into bore 72. The outer diameter of insertion portion 36 is only slightly less than the inner diameter of bore 72 to limit the amount of lateral movement of the tube 12 within housing 14. Simultaneously, the O-rings are being received within the bore 78. Inclined portion 76 guides the compression ring 52 into bore 78. The outer diameter of compression ring 52 is only slightly less than the inner diameter of bore 78 to provide additional lateral support to tube 12. Lateral support is also provided by the close fit between top hat 22 and bore 78 and the exterior of insertion portion 36 and bore 72. As illustrated in FIG. 1, spring 34 engages shoulder 70 of groove 64 at this stage of insertion.

Figure 2:
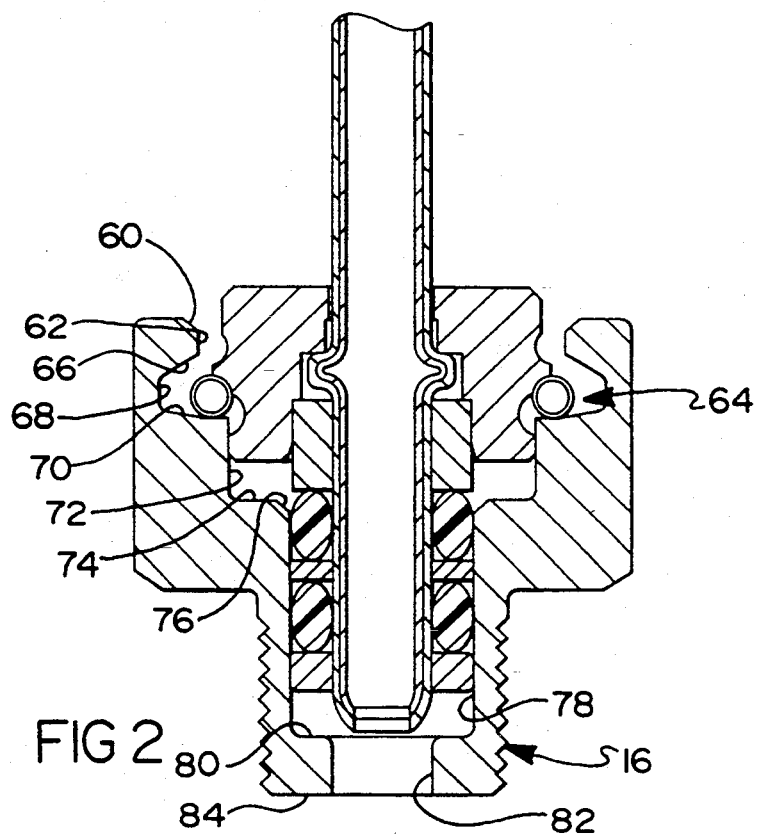
FIG. 2 is a cross-sectional view of the high pressure quick connect of the present invention with the tube being at a further stage of insertion.
Figure 3:
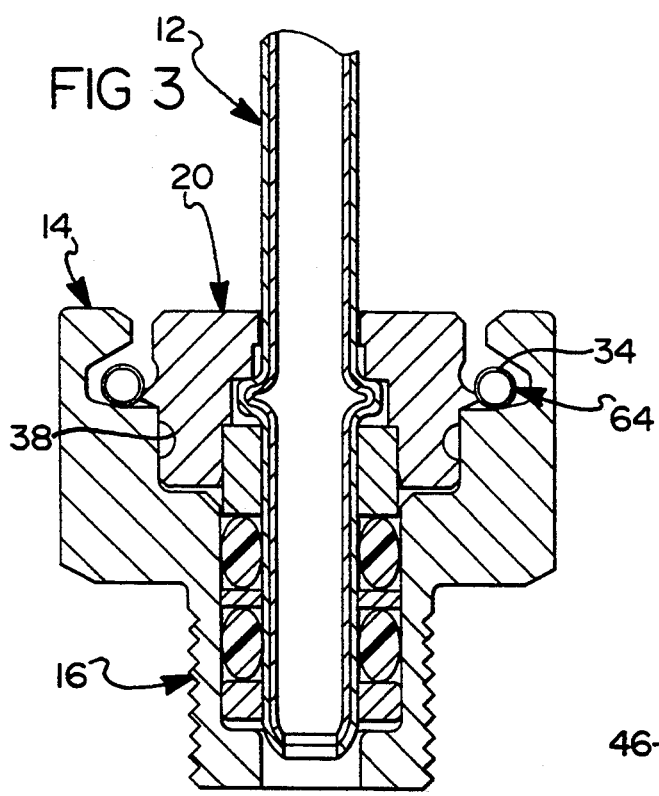
FIG. 3 is a cross-sectional view of the high pressure quick connect of the present invention with the tube being at a still further stage of insertion.

Referring to FIG. 2, a further stage of insertion is illustrated. In this stage, tube 12 has been inserted further into housing 14 and spring 34 has been forced from radiused portion 38. Removal of spring 34 from radiused portion 38 is a result of pressure applied to the bottom of spring 34 by shoulder 74 at a point which is slightly over center of spring 34. Spring 34 is caused to expand slightly and to move out of portion 38 onto inclined section 40 of cap 20. Upon further insertion of tube 12, spring 34 is further expanded by the slight incline of shoulder 74 acting in conjunction with section 40 and then flanged portion 42, which has a slightly steeper incline along its bottom wall. The expansion of spring 34 continues until the spring is at the outer tip of flange 42. See FIG. 3.

Figure 4:
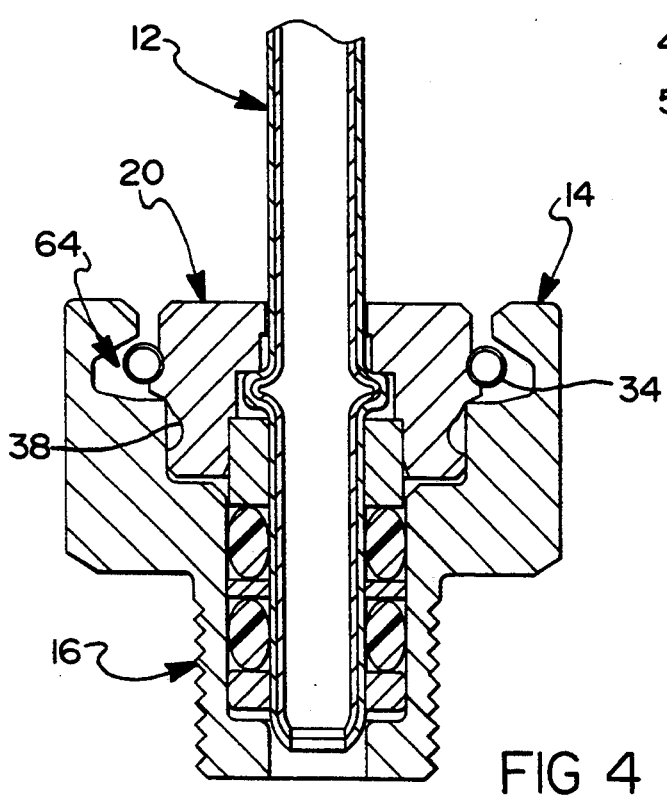
FIG. 4 is a cross-sectional view of the high pressure quick connect of the present invention with the tube locked in the housing.

As illustrated in FIG. 4, after slight further insertion, spring 34 retract into locking groove 44. As can be seen, the diameter of the cap 20 at groove 44 is greater than the diameter of cap 20 at groove 38 which results in spring 34 being expanded into the path of inclined wall 66 of groove 64. As should be appreciated, groove 44 applies surface contact to spring 34 to distribute any force acting upon it over a larger area of spring 34 than would be obtained if there were only point or line contact. As can be seen, flange 42 engages spring 34 slightly before the lateral center line of spring 34 which causes spring 34 to be forced outwardly against the edge of inclined wall 66 where it meets recessed portion 62. In this way, if tube 12 is attempted to be pulled out of housing 14, spring 34 is put into shear must be compressed in shear to allow flange 42 to pass. This would require considerable force of a magnitude greater than 500 lbs of force and of such a magnitude that the tube itself would likely fail before sufficient force to compress spring 34 in shear is obtained.

To disassemble the tube assembly 12 from housing 14, a tool has to be used which can expand spring 34 sufficiently to allow flange 42 to pass by spring 34. As can be seen, terminal portion 46 of cap 20 has a diameter that is only slightly greater than the diameter of the cap at the innermost point of locking radius 44. If an imaginary line were extended from portion 46 it would just barely intersect spring 34. In this way, a tool can be inserted into recess 62 and engage spring 34 with the contact point of the tool's end engaging spring 34 between the side that is in engagement with locking groove 44 and the lateral centerline of spring 34 causing spring 34 to expand along the inclined wall 66 of groove 64. An example of a tool that could be used to expand spring 34 in this way is shown in U.S. patent application Ser. No. 07/807,533 filed Dec. 13, 1991 now U.S. Pat. No. 5,187,851 which is assigned to the assignee of the present invention and was invented by one of the co-inventors of the present invention.

As should be appreciated from the above, the insertion force is minimal because insertion of the tube 12 only requires expansion of spring 34 about flange 42 which is assisted by the inclined surfaces along the exterior of cap 20. Insertion forces of only about 15 pounds force are required. After insertion the retention force is of a magnitude greater than 500 pounds because the spring has to be compressed in shear to extract the tube assembly.

A preferred embodiment of the present invention has been disclosed. A worker of ordinary skill in the art would realize, however, that certain modifications would come within the teaching of this invention. Therefore, the following claims should be studied in order to determine the true scope and content of the invention.

What is claimed is:

1. A high pressure quick connect comprising:
   a tube having an upset adjacent one end thereof;
   a male locking assembly positioned about said tube, said male locking assembly including a cavity enclosing said upset and a contoured outer surface defining spaced recessed groove wherein said recessed grooves are separated by a flange means;
   an expandable annular locking ring mounted about said contoured outer surface, said flange means allowing said locking ring to slide between said spaced recessed grooves, wherein said flange means is adapted to act upon said annular locking ring as said tube is urged from said female member;
   a female member having an internal bore adapted to receive said male locking assembly, said internal bore of said female member having a retainer groove;
   whereby, one of said recessed grooves is adjacent said retainer groove upon full insertion of said male locking assembly into said female member with said expandable annular locking ring being operatively trapped between said one recessed groove and said retainer groove to prevent said male locking assembly from being withdrawn from said female member wherein said flange means is in surface contact with said annular locking ring and said mating contact forces said annular locking ring outwardly into engagement with said retainer groove upon attempted withdrawal of said tube from said female member.

2. The high pressure quick connect of claim 1, wherein said male locking assembly includes a locking cap and a retaining ring coupled to said locking cap, said cavity being defined by said locking cap and said retaining ring.

3. The high pressure quick connect of claim 1, wherein said tube includes sealing means thereon for sealing said tube with respect to said female member.

4. The high pressure quick connect of claim 1, wherein said one of said grooves has a greater diameter than said other groove.

5. The high pressure quick connect of claim 1, wherein said male locking assembly engages the inner walls of said female member when said male member is fully inserted to resist lateral forces applied to said tube.

6. A high pressure quick connect comprising:
   a tube having an upset adjacent one end thereof;
   a male locking assembly positioned about said tube, said male locking assembly including a cavity enclosing said upset and a contoured outer surface defining first and second grooves spaced axially along said male locking assembly wherein said recessed grooves are separated by a flange means;
   a female member having an internal bore adapted to receive said male locking assembly, said internal bore having a retaining groove;

an expandable annular locking ring mounted about said contoured outer surface, said locking ring initially being mounted in said first groove and wherein said flange means allows said locking ring to slide from said first groove to said second groove upon axial movement of said male locking assembly into said female member, wherein said flange means is adapted to act upon said locking ring as said tube is attempted to be withdrawn from said female member;

said second groove being adjacent said retaining groove upon full insertion of said male locking member into said female locking member with said expandable annular locking ring being positioned within said second groove and adjacent said retaining groove such that said locking ring is nested between said adjacent second groove and said retaining groove wherein said flange means is in surface to surface contact with said spring and forces said spring outwardly into engagement with said retainer groove upon attempted withdrawal of said tube from said female member.

7. The high pressure quick connect of claim 6, wherein said male locking assembly includes a locking cap and a retaining ring coupled to said locking cap, said cavity being defined by said locking cap and said retaining ring.

8. The high pressure quick connect of claim 6, wherein said tube includes sealing means thereon for sealing said tube with respect to said female member.

9. The high pressure quick connect of claim 6, wherein said one of said grooves has a greater diameter than said other groove.

10. The high pressure quick connect of claim 6, wherein said male locking assembly engages the inner walls of said female member when said male member is fully inserted to resist lateral forces applied to said tube.

11. The high pressure quick connect of claim 6, wherein said internal bore includes a shoulder, said locking ring initially being mounted in said first groove and slidable from said first groove to said second groove upon engagement with said shoulder and axial movement of said tube into said housing.

12. A high pressure quick connect comprising:
a tube having an upset adjacent one end thereof;
a male locking assembly positioned about said tube, said male locking assembly including a cavity enclosing said upset and a contoured outer surface defining spaced recessed groove wherein said recessed grooves are separated by a flange means;
an expandable annular locking ring mounted about said contoured outer surface, said flange means allowing said locking ring to slide between said spaced recessed grooves, wherein said flange means is adapted to act upon said annular locking ring as said tube is urged from said female member;
a female member having an internal bore adapted to receive said male locking assembly, said internal bore of said female member having a retainer groove;
whereby, one of said recessed grooves is adjacent said retainer groove upon lull insertion of said male locking assembly into said female member with said expandable annular locking ring being operatively trapped between said one recessed groove and said retainer groove to prevent said male locking assembly from being withdrawn from said female member;

wherein said tube is a preassembled unit including said male locking assembly and sealing means.

13. A high pressure quick connect comprising:
a tube having an upset adjacent one end thereof;
a male locking assembly positioned about said tube, said male locking assembly including a cavity enclosing said upset and a contoured outer surface defining spaced recessed groove wherein said recessed grooves are separated by a flange means;
an expandable annular locking ring mounted about said contoured outer surface, said flange means allowing said locking ring to slide between said spaced recessed grooves, wherein said flange means is adapted to act upon said annular locking ring as said tube is urged from said female member;
a female member having an internal bore adapted to receive said male locking assembly, said internal bore of said female member having a retainer groove;
whereby, one of said recessed grooves is adjacent said retainer groove upon full insertion of said male locking assembly into said female member with said expandable annular locking ring being operatively trapped between said one recessed groove and said retainer groove to prevent said male locking assembly from being withdraw from said female member;
wherein said grooves are separated from said flange by inclined surfaces which facilitate the movement of said spring between said first and second recessed grooves.

14. A high pressure quick connect comprising:
a tube having an upset adjacent one end thereof;
a male locking assembly positioned about said tube, said male locking assembly including a cavity enclosing said upset and a contoured outer surface defining first and second grooves spaced axially along said male locking assembly wherein said recessed grooves are separated by a flange means;
a female member having an internal bore adapted to receive said male locking assembly, said internal bore having a retaining groove;
an expandable annular locking ring mounted about said contoured outer surface, said locking ring initially being mounted in said first groove and wherein said flange means allows said locking ring to slide from said first groove to said second groove upon axial movement of said male locking assembly into said female member, wherein said flange means is adapted to act upon said locking ring as said tube is attempted to be withdrawn from said female member;
said second groove being adjacent said retaining groove upon full insertion of said male locking member into said female locking member with said expandable annular locking ring being positioned within said second groove and adjacent said retaining groove such that said locking ring is nested between said adjacent second groove and said retaining groove;
wherein said tube is a preassembled unit including said male locking assembly and sealing means.

15. A high pressure quick connect comprising:
a tube having an upset adjacent one end thereof;
a male locking assembly positioned about said tube, said male locking assembly including a cavity enclosing said upset and a contoured outer surface defining first and second grooves spaced axially along said male locking assembly wherein said recessed grooves are separated by a flange means;

a female member having an internal bore adapted to receive said male locking assembly, said internal bore having a retaining groove;

an expandable annular locking ring mounted about said contoured outer surface, said locking ring initially being mounted in said first groove and wherein said flange means allows said locking ring to slide from said first groove to said second groove upon axial movement of said male locking assembly into said female member, wherein said flange means is adapted to act upon said locking ring as said tube is attempted to be withdrawn from said female member;

said second groove being adjacent said retaining groove upon full insertion of said male locking member into said female locking member with said expandable annular locking ring being positioned within said second groove and adjacent said retaining groove such that said locking ring is nested between said adjacent second groove and said retaining wherein said grooves are separated from said flange means by inclined surfaces which facilitate the movement of said spring between said first and second recessed grooves.

* * * * *

UNITED STATES PATENT AND TRADEMARK OFFICE
CERTIFICATE OF CORRECTION

PATENT NO. : 5,342,095

DATED : August 30, 1994

INVENTOR(S) : Klinger et al

It is certified that error appears in the above-indentified patent and that said Letters Patent is hereby corrected as shown below:

Column 7, line 62, claim 12, please delete "lull" and insert --full--.

Signed and Sealed this

Twentieth Day of December, 1994

Attest:

BRUCE LEHMAN

Attesting Officer     Commissioner of Patents and Trademarks